(12) United States Patent
Hashimoto

(10) Patent No.: US 6,333,904 B1
(45) Date of Patent: Dec. 25, 2001

(54) OPTICAL-DISC RECORDING DEVICE

(75) Inventor: Hirokuni Hashimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/266,743

(22) Filed: Mar. 12, 1999

(30) Foreign Application Priority Data

Apr. 1, 1998 (JP) .......................................... 10-089006

(51) Int. Cl.[7] ................................................ G11B 7/00
(52) U.S. Cl. .................... 369/53.44; 369/47.1; 369/59.1
(58) Field of Search ............................ 369/47, 48, 49, 369/50, 54, 58, 59, 83, 84, 47.1, 47.11, 47.12, 47.13, 53.1, 53.11, 53.12, 53.15, 53.2, 53.31, 53.35, 53.41, 59.1

(56) References Cited

U.S. PATENT DOCUMENTS 5,058,096 A   10/1991  Ando et al.
5,434,838 A  *  7/1995  Haneda ........................ 369/58
5,598,391 A  *  1/1997  Mukawa ........................ 369/54
5,745,444 A  *  4/1998  Ichikawa et al. ........... 369/58 X

FOREIGN PATENT DOCUMENTS

EP      0 399 853 A2    5/1990
EP      803 815 A1     10/1997
JP      6-349068       12/1994

OTHER PUBLICATIONS

Communication from the German PTO (i.e. official letter); translation of the official letter.
Michael Mielewczik, "Brennende Zukunft" Software Intern pp. 115–118, Jul. 1999.

* cited by examiner

Primary Examiner—Muhammad Edun
(74) Attorney, Agent, or Firm—Dickstein Shapiro Morin & Oshinsky LLP

(57) ABSTRACT

Data is recorded on and data is reproduced from an optical disc in a multi-session recording system on optical disc on which re-recording of data is possible. Contents of a last session of the optical disc are rewritten from contents indicating that a subsequent session does not exist to contents indicating that a subsequent session exists.

3 Claims, 6 Drawing Sheets

OPTICAL-DISC RECORDING DEVICE

BACKGROUND OF THE INVENTION

1. Field of the Invention

The present invention relates to an optical-disc recording device such as a CD-RW drive or the like which records data on an optical disc such as a CD-RW or the like, which is used as a data recording medium and on which rewriting of data is possible.

2. Description of the Related Art

On each of an optical disc such as a CD-R to which only appending of data is possible and an optical disc such as a CD-RW on which rewriting of data is also possible, data is recorded in a recording area in recording units called sessions. Each session includes three areas: a lead-in area, a program area and a lead-out area.

In the program area, data is recorded in data recording units called tracks or packets. In the lead-in area, a table of contents of tracks (TOC) is recorded.

A system in which a plurality of such sessions exist in one optical disc is referred to as a multi-session recording system. In the multi-session recording system, respective sessions are given numbers in increasing order, and are referred to as a first session, a second session, . . . .

The optical-disc recording device determines whether or not an (n+1)-th session (where 'n' is a positive integer other than '0') exists based on information in the lead-in area of an n-th session.

For example, when data is reproduced from an optical disc on which data was recorded in the multi-session system, the lead-in area is looked at from the first session in sequence. Whether or not an (n+1)-th session exists outside of an n-th session is determined as a result of whether or not a flag indicating existence of the (n+1)-th session is recorded in the lead-in area of the n-th session.

Even if the flag indicating existence of the (n+1) session is not recorded in the lead-in area of the n-th session, it is possible that the lead-in area of the (n+1)-th session exists. However, in this case, even if the lead-in area of the (n+1)-th session exists, the existence of the (n+1)-th session is not recognized in the standards. Further, there is a possibility that data was recorded but the data should not exist in the current recording. Therefore, data which should not exist exists. (For example, see Japanese Laid-Open Patent Application No. 6-349068.)

Specifically, when the flag indicating existence of a subsequent session is recorded in the lead-in area of the n-th session on the optical disc, the optical-disc recording device determines that the subsequent (n+1)-th session exists, and can perform recording data on and reproducing data from the (n+1)-th session.

When the above-mentioned flag is not recorded in the lead-in area of the n-th session, or a flag indicating absence of a subsequent session is recorded there, the optical-disc recording device determines that the (n+1)-th session does not exist, and, therefore, cannot perform recording data on and reproducing data from the (n+1)-th session.

Therefore, either as a result of not recording the flag indicating existence of a subsequent session or as a result of recording the flag indicating absence of a subsequent session on a session of an optical disc, it is possible to disable data from being appended to the optical disc.

For example, writing is possible once on an optical disc such as a CD-R to which appending of data is possible. Therefore, once data is recorded in the lead-in area, after that, re-recording (rewriting) cannot be performed. Accordingly, either as a result of not recording the flag indicating existence of a subsequent session or as a result of recording the flag indicating absence of a subsequent session at the time of recording the lead-in area, after that, appending of data to the optical disc cannot be performed.

Further, rewriting of data is possible on an optical disc such as a CD-RW on which re-recording of data is possible. However, in the optical-disc recording device in the related art, once appending of data to the optical disc is made impossible either as a result of not recording the flag indicating existence of a subsequent session or as a result of recording the flag indicating absence of a subsequent session at the time of recording the lead-in area, after that, appending of data to the optical disc cannot be performed again.

SUMMARY OF THE INVENTION

The present invention is directed to eliminating the above-mentioned problem. An object of the present invention is to enable appending of data to an optical disc again, on which optical disc rewriting of data is possible, and to which optical disc appending of data was made impossible.

An optical-disc recording device, according to the present invention, comprises:

means for recording data on and reproducing data from an optical disc in a multi-session recording system, on which optical disc re-recording of data is possible; and last-session rewriting means for rewriting contents of a last session of the optical disc from contents indicating that a subsequent session does not exist to contents indicating that a subsequent session exists.

In this arrangement, data is recorded on and data is reproduced from an optical disc in a multi-session recording system, on which optical disc re-recording of data is possible. Further, contents of a last session of the optical disc are rewritten from contents indicating that a subsequent session does not exist to contents indicating that a subsequent session exists.

Specifically, when a flag indicating absence of a subsequent session is recorded in the last session, rewriting of contents of the last session is performed so that a flag indicating existence of a subsequent session is recorded in the last session. When no flag indicating existence of a subsequent session is recorded in the last session, rewriting of contents of the last session is performed so that the flag indicating existence of a subsequent session is recorded in the last session. Thereby, the state of the optical disc on which re-recording of data is possible can be changed from the state in which appending of data to the optical disc is not possible to the state in which appending of data to the disc is possible again.

It is preferable to further provide means for rewriting contents of the last session of the optical disc from contents indicating that a subsequent session exists to contents indicating that a subsequent session does not exist.

In this arrangement, contents of the last session of the optical disc are rewritten from contents indicating that a subsequent session exists to contents indicating that a subsequent session does not exist.

Specifically, when the flag indicating existence of a subsequent session is recorded in the last session, rewriting of contents of the last session is performed so that either the flag indicating absence of a subsequent session is recorded or no flag indicating existence of a subsequent session is recorded in the last session. Thereby, the state of the optical disc on which re-recording of data is possible can be changed from the state in which appending of data to the optical disc is possible to the state in which appending of data to the disc is not possible.

In addition, it is preferable to further provide means for preventing the last-session rewriting means from rewriting the contents of the last session when the remaining capacity of the recording area of the optical disc is so small that one session cannot be formed by using the remaining capacity.

In this arrangement, rewriting of the contents of the last session is prevented when the remaining capacity of the recording area of the optical disc is so small that one session cannot be formed by using the remaining capacity. Therefore, when there is no space for forming one session (at least, a space of one track for forming the lead-in area, lead-out area, and program area) in the optical disc, it is possible to prevent uselessly rewriting of the contents of the last session so as to prevent appending of data to the optical disc from being enabled.

Other objects and further features of the present invention will become more apparent from the following detailed description when read in conjunction with the accompanying drawings.

BRIEF DESCRIPTIONS OF DRAWINGS

Figure 1:
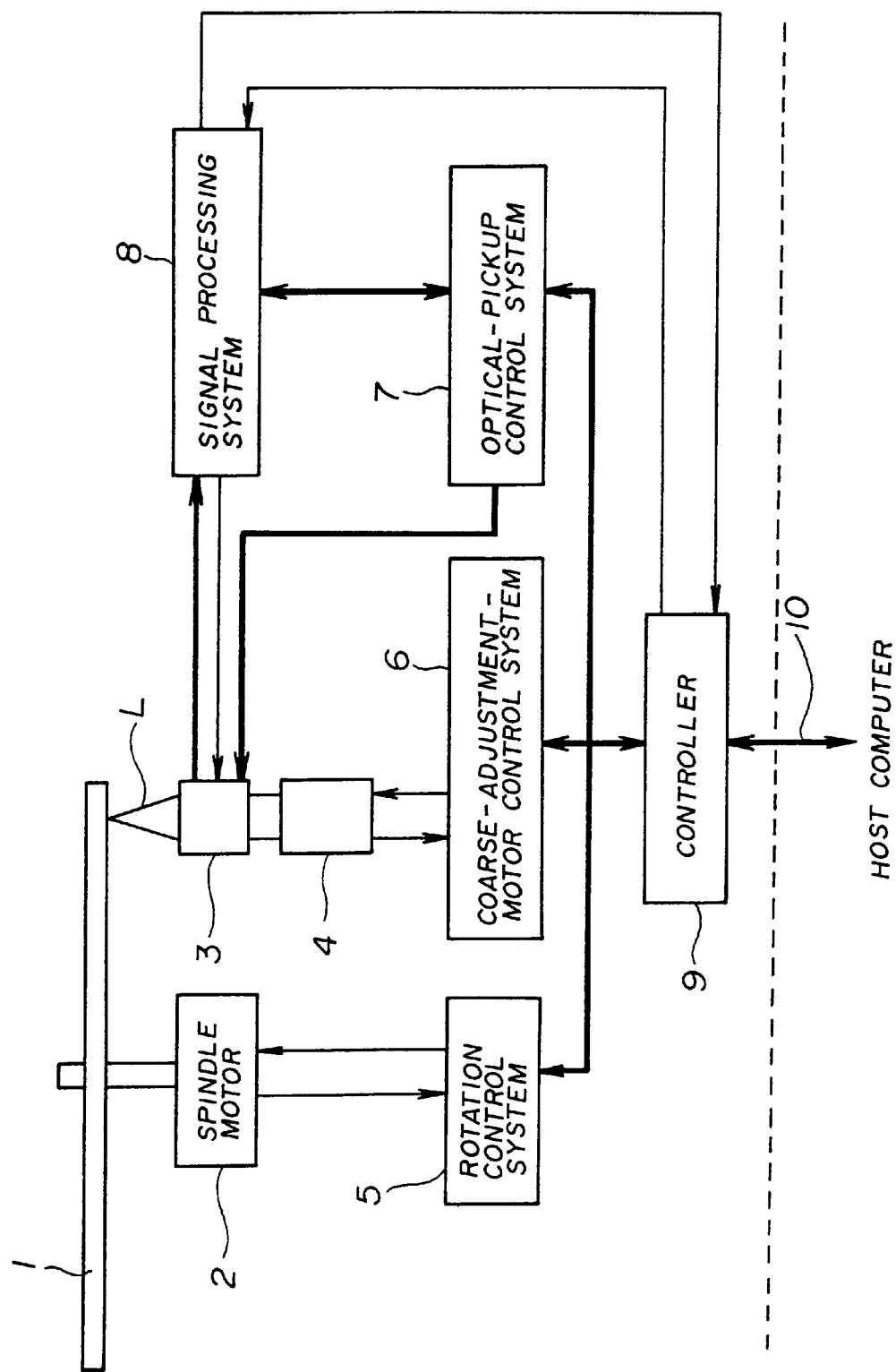
FIG. 1 shows a block diagram of an optical-disc recording device in one embodiment of the present invention.
Figure 5:
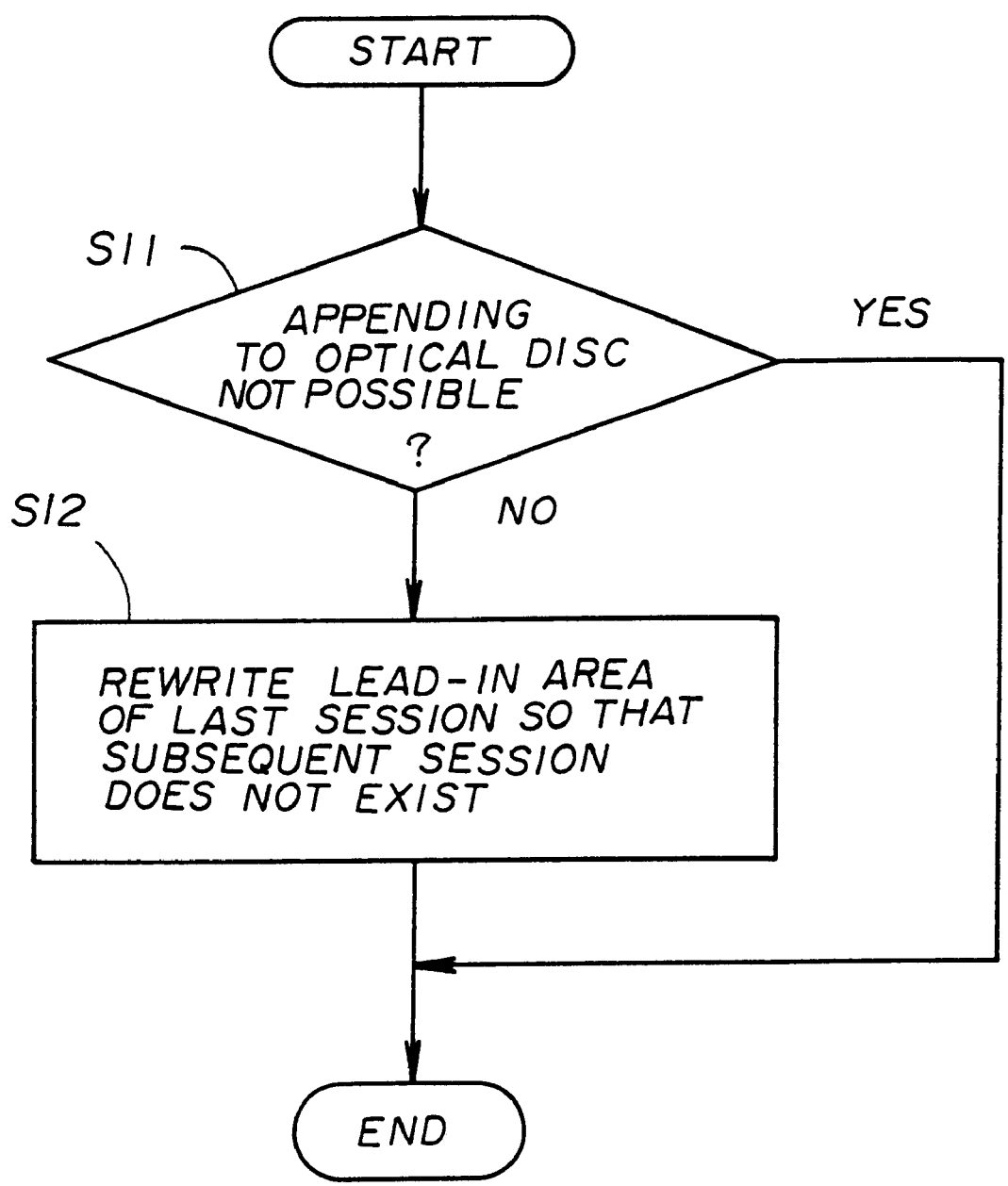
Figure 6:
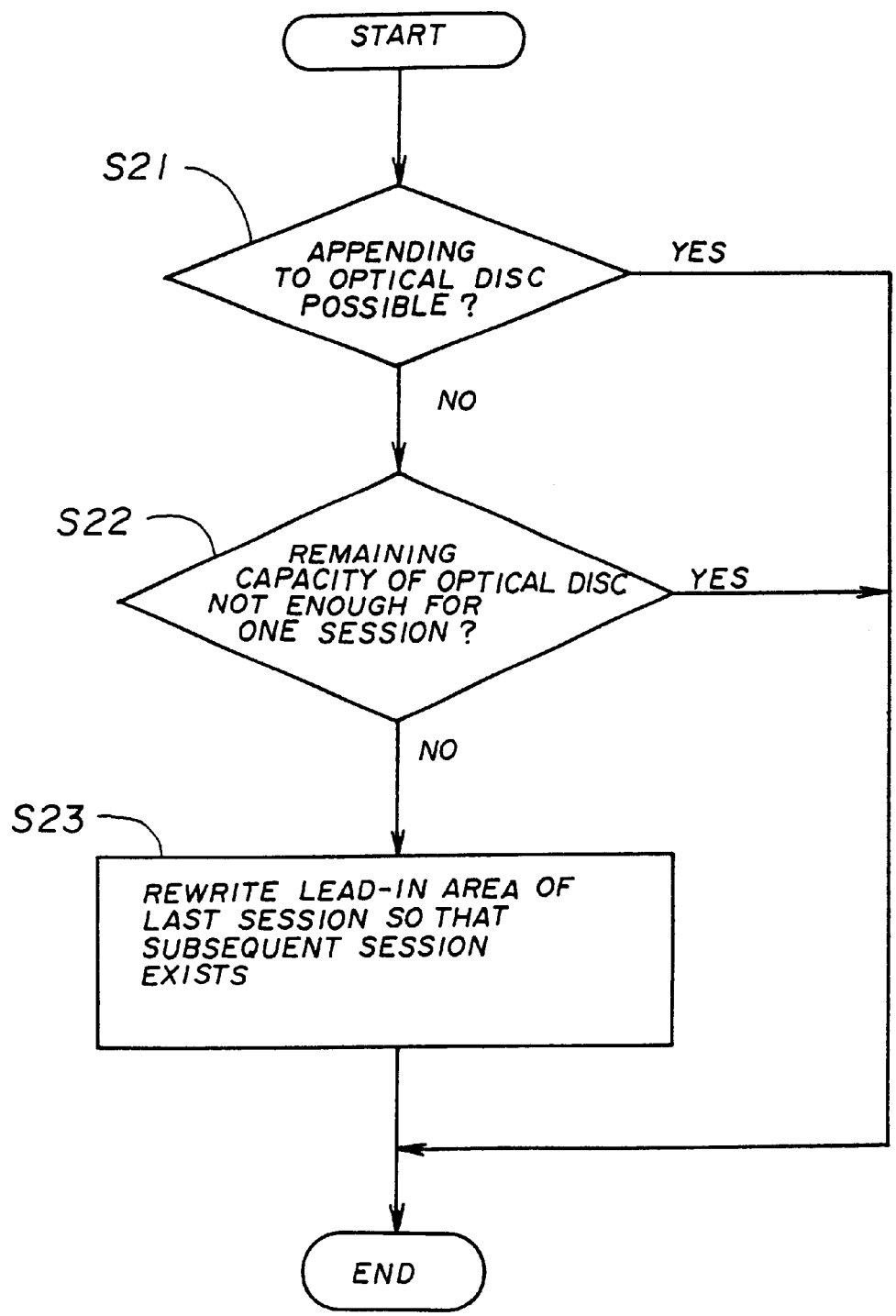

FIG. 5 shows a flowchart of a process performed when the state of the optical disc in the optical-disc recording device shown in FIG. 1 is changed from the state in which appending of data to the optical disc is possible to the state in which appending of data to the optical disc is not possible; and FIG. 6 shows a flowchart of a process performed when the process performed when the state of the optical disc in the optical-disc recording device shown in FIG. 1 is changed from the state in which appending of data to the optical disc is not possible to the state in which appending of data to the optical-disc is possible is prevented from being performed.

DETAILED DESCRIPTION OF PREFERRED EMBODIMENT

FIG. 1 shows a block diagram of an optical-disc recording device in one embodiment of the present invention.

The optical-disc recording device includes a microcomputer which includes a CPU, a ROM, a RAM and so forth. The microcomputer acts as a rotation control system 5, a coarse-adjustment-motor control system 6, an optical-pickup control system 7, a signal processing system 8 and a controller 9.

The optical-disc recording device further includes a spindle motor 2 which rotates an optical disc 1 such as a CD-RW on which re-recording (rewriting) of data is possible, an optical pickup 3 which has a semiconductor laser mounted therein and applies laser light L to the recording area of the optical disc 1, and a coarse-adjustment motor 4 which moves the optical pickup 3 in a radial direction of the optical disc 1 in cooperation with a seek motor provided in the optical pickup 3.

The rotation control system 5 controls rotation of the spindle motor 2. The coarse-adjustment-motor control system 6 controls driving of the coarse-adjustment motor 4. The optical-pickup control system 7 controls the optical pickup 3. The signal processing system 8 transmits and receives a signal of data which has been read from the optical disc 1 through the optical pickup 3 and a signal of data which will be written in the recording area of the optical disc 1 through the optical pickup 3. The controller 9 performs control of the above-mentioned control systems 5, 6, 7 and signal processing system 8, and, also, performs control of operations concerning the present invention, which operations will be described later.

Further, the controller 9 is connected with a host computer via an external interface 10. The controller 9 transmits data read from the optical disc 1 to the host computer, and receives data to be written on the optical disc 1 from the host computer.

Further, in the optical-disc recording device, the optical pickup 3 is moved in the radial direction of the optical disc 1 while the optical disc 1 is rotated by the spindle motor 2, the laser light L emitted from the semiconductor laser is applied to the recording area on the recording surface of the optical disc 1, and data is recorded on the optical disc 1 or data is reproduced from the optical disc 1.

Thus, the controller 9 and so forth executes a function of means which records data on and reproduces data from the optical disc 1, on which rewriting of data is possible, in the multi-session recording system, and, also, a function of last-session rewriting means which rewrites contents of the last session of the optical disc 1 from contents indicating that a subsequent session does not exist to contents indicating that a subsequent session exists.

Further, the controller 9 and so forth also executes a function of means which rewrites contents of the last session of the optical disc 1 from contents indicating that a subsequent session exists to contents indicating that a subsequent session does not exist.

Further, the controller 9 and so forth also executes a function of means which prevents the last-session rewriting means from rewriting the contents of the last session when the remaining capacity of the recording area of the optical disc 1 is so small that one session cannot be formed by using the remaining capacity.

Figure 2:
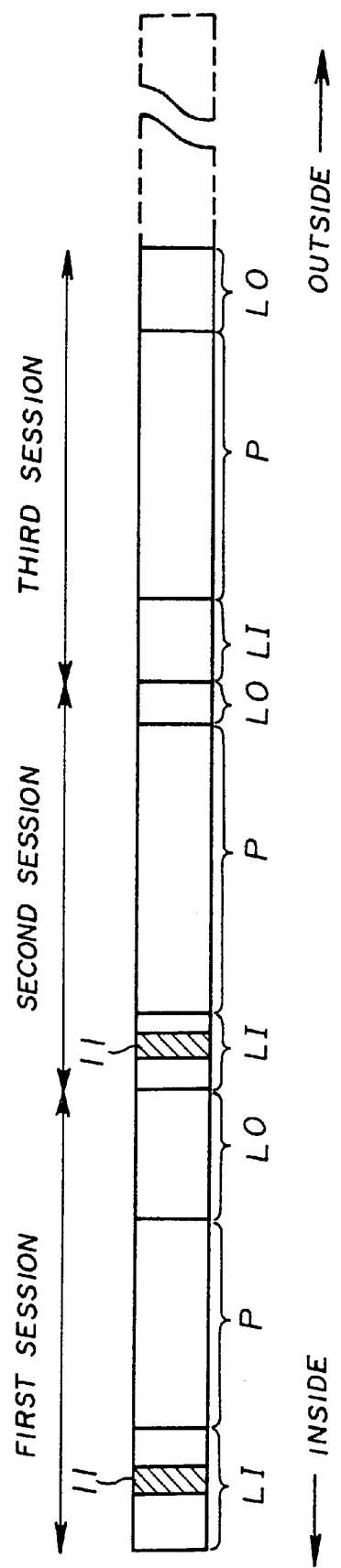
FIG. 2 shows one example of a data format of an optical disc, shown in FIG. 1, in a state which appending of data to the optical disc is not possible in a multi-session recording system.

FIG. 2 shows an example of a data format of the optical disc 1 in a state in which appending to the optical disc 1 is not possible in the multi-session recording system.

Each session of first, second and third sessions includes a lead-in area LI, a program area P and a lead-out area LO.

In the lead-in area LI of each of the first and second sessions, a flag 11 indicating existence of a subsequent session is recorded. As a result, recording data in and reproducing data from the second and third sessions are possible. However, because the flag 11 indicating existence of a subsequent session is not recorded in the lead-in area LI of the third session, a fourth session cannot exist. As a result, the optical disc 1 is in a state in which appending of data of the fourth session and subsequent sessions to the optical disc 1 is not possible.

In the optic al-disc recording device, as a result of the flag 11 indicating existence of a subsequent session being written in the lead-in area LI of the third session under control by the controller 9, it is possible to change the state of the optical disc 1 so that the fourth session exists. Thus, it is possible to cause the optical disc 1 to enter a state in which appending of data of the fourth session and subsequent sessions to the optical disc 1 is possible.

When a flag indicating absence of a subsequent session is recorded in the lead-in area LI of the third session, as a result of this flag being deleted and the flag 11 indicating the existence of a subsequent session being written there, it is possible to cause the optical disc 1 to enter the state in which appending of data of the fourth session and subsequent sessions to the optical disc, 1 is possible.

Figure 3:
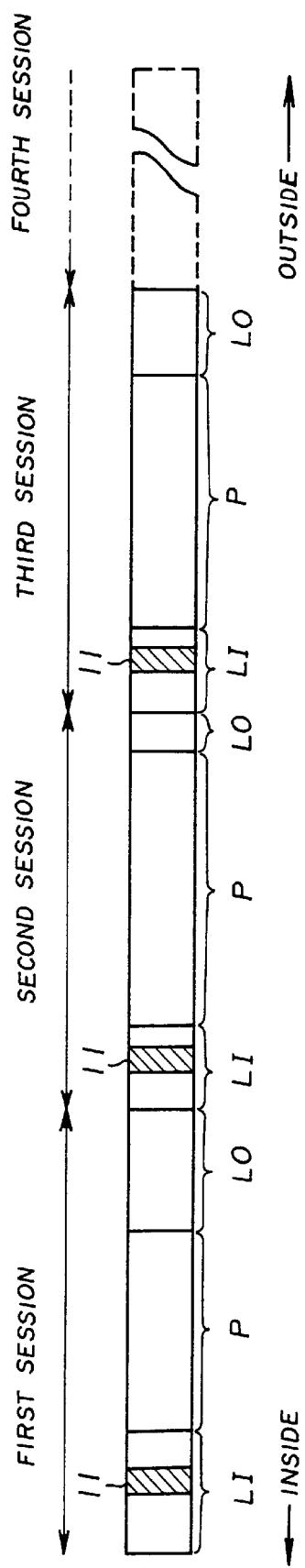
FIG. 3 shows one example of a data format of the optical disc, shown in FIG. 1, in a state which appending of data to the optical disc is possible in the multi-session recording system.

FIG. 3 shows an example of a data format of the optical disc 1 in a state in which appending to the optical disc 1 is possible in the multi-session recording system.

In this case, because, in the lead-in area LI of each of the first, second and third sessions, the flag 11 indicating existence of a subsequent session is recorded, the optical disc 1 is in a state in which recording of data in and reproducing of data from the second, third and fourth sessions are possible, and appending of data of the fourth session to the optical disc 1 is possible.

In the optical-disc recording device, it is possible to change the state of the optical disc 1 to a state in which appending of data of the fourth session and subsequent sessions to the optical disc 1 is not possible, as a result of deleting the flag 11 indicating existence of a subsequent session from the lead-in area LI of the third session, or overwriting the flag indicating absence of a subsequent session on the flag 11, so that the fourth session does not exist.

Figure 4:
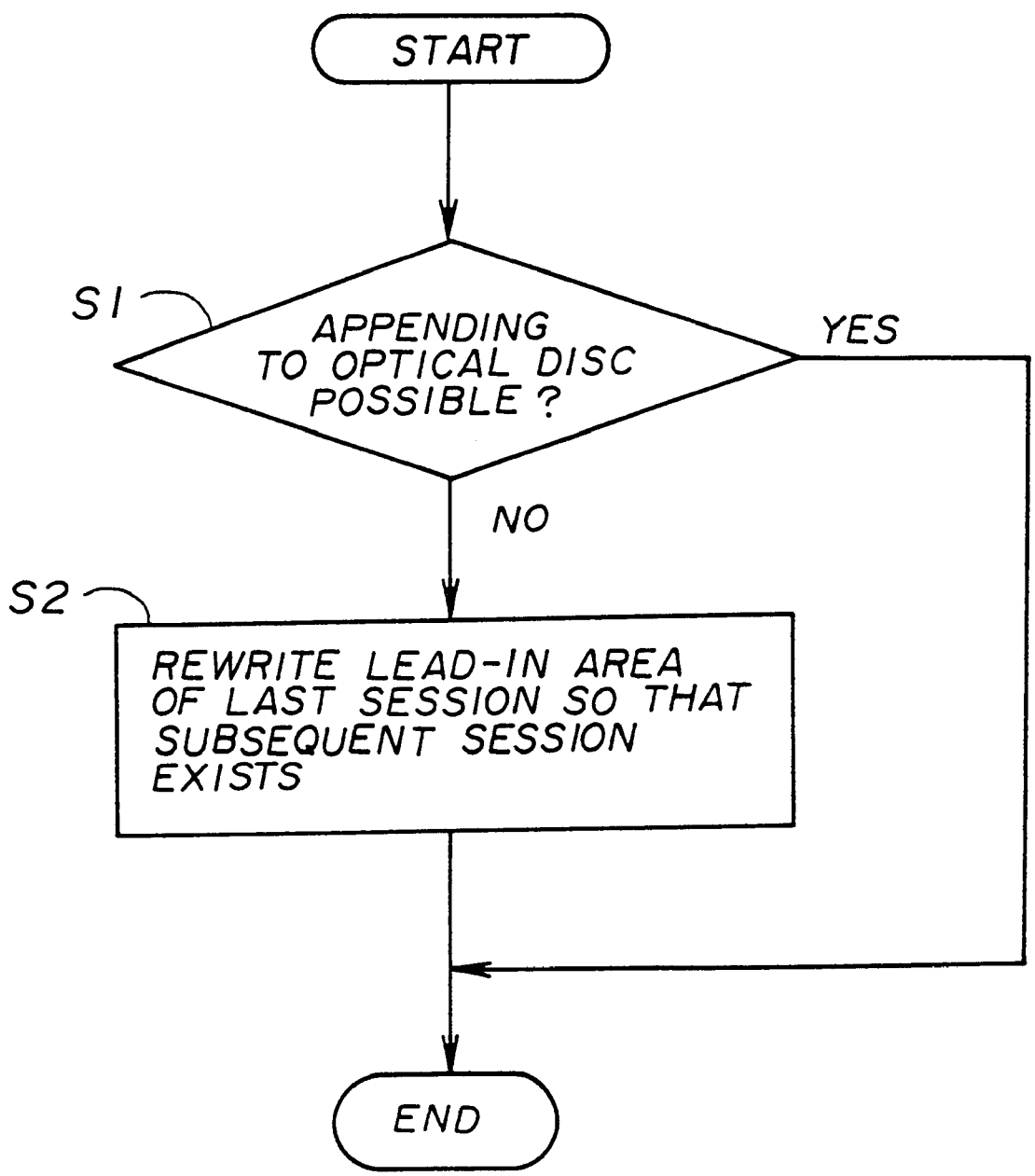
FIG. 4 shows a flowchart of a process performed when the state of the optical disc in the optical-disc recording device shown in FIG. 1 is changed from the state in which appending of data to the optical disc is not possible to the state in which appending of data to the optical disc is possible.

FIG. 4 shows a flowchart of a process, in the optical-disc recording device, performed by the controller 9 when the state of the optical disc 1 in which appending of data to the optical disc 1 is not possible is changed into the state in which appending of data to the optical disc 1 is possible.

The controller 9 finishes this process when determining in a step S1 that appending of data to the optical disc 1 is possible as a result of the flag indicating existence of a subsequent session being recorded in the lead-in area of the last session of the recording area of the optical disc 1.

On the other hand, when determining in the step S1 that appending of data to the optical disc 1 is not possible as a result of either the flag indicating existence of a subsequent session not being recorded or the flag indicating absence of a subsequent session being recorded, the controller 9 executes a step S2, and, thus, rewrites the lead-in area of the last session so that the flag indicating existence of a subsequent session is recorded in the lead-in area of the last session, and, as a result, the state of the optical disc 1 is changed into the state in which appending of data to the optical disc 1 is possible. Then, the controller 9 finishes this process.

Thus, by writing the flag indicating existence of a subsequent session in the lead-in area of the last session of the optical disc 1, it is possible to cause the optical disc 1 to enter the state in which appending of data to the optical disc 1 is possible.

FIG. 5 shows a flowchart of a process, in the optical-disc recording device, performed by the controller 9 when the state of the optical disc 1 in which appending of data to the optical disc is possible is changed into the state in which appending of data to the optical disc is not possible.

The controller 9 finishes this process when determining in a step S11 that appending of data to the optical disc 1 is not possible as a result of either the flag indicating existence of a subsequent session not being recorded or the flag indicating absence of a subsequent session being recorded in the lead-in area of the last session of the recording area of the optical disc 1.

On the other hand, when determining in the step 11 that appending of data to the optical disc 1 is possible as a result of the flag indicating existence of a subsequent session being recorded, the controller 9 executes a step S12, and, thus, rewrites the lead-in area of the last session so that either the flag indicating existence of a subsequent session is not recorded or the flag indicating absence of a subsequent session is recorded in the lead-in area of the last session, and, as a result, the state of the optical disc 1 is changed into the state in which appending of data to the optical disc 1 is not possible. Then, the controller 9 finishes this process.

Thus, by rewriting the lead-in area either so as not to write the flag indicating existence of a subsequent session or so as to write the flag indicating absence of a subsequent session in the lead-in area of the last session of the optical disc 1, it is possible to cause the optical disc 1 to enter the state in which appending of data to the optical disc 1 not is possible.

FIG. 6 shows a flowchart of a process, performed by the controller 9 in the optical-disc recording device, of preventing the state of the optical disc 1 from being changed from the state in which appending of data to the optical disc 1 is not possible into the state in which appending of data to the optical disc is possible, when the remaining capacity of the optical disc 1 is so small that one session cannot be formed by using the remaining capacity.

The controller 9 determines in a step S21 whether the optical disc 1 is in the state in which appending of data to the optical disc 1 is possible or not possible, as in the step S1, shown in FIG. 4. When determining in the step S21 that the optical disc 1 is in the state in which appending of data to the optical disc 1 is possible, the controller 9 finishes this process. When determining in the step S21 that the optical disc 1 is in the state in which appending of data to the optical disc 1 is not possible, the controller 9 executes a step S22, and, thus, determines whether or not the remaining capacity of the optical disc 1 is so small that one session cannot be formed by using the remaining capacity. When determining in the step S22 that the remaining capacity of the optical disc 1 is so large that one session can be formed by using the remaining capacity, the controller 9 executes a step S23, and, thus, rewrites the lead-in area of the last session so that the flag indicating existence of a subsequent session is recorded in the lead-in area of the last session, as in the step S2, shown in FIG. 4. Then, the controller 9 finishes this process. However, when determining in the step S22 that the remaining capacity of the optical disc 1 is so small that one session cannot be formed by using the remaining capacity, the controller 9 prevents rewriting of the lead-in area of the last session so as to prevent the state of the optical disc 1 from being changed into the state in which appending of data to the optical disc is possible, and, then, finishes this process.

Thus, the controller 9 prevents the step of changing the state of the optical disc 1 into the state in which appending of data to the optical disc 1 is possible from being executed when the remaining capacity of the optical disc 1 is so small that one session cannot be formed by using the remaining capacity, at the time the controller 9 would otherwise change the state of the optical disc 1 from the state in which appending of data to the optical disc 1 is not possible to the state in which appending of data to the optical disc 1 is possible. As a result, it is possible to prevent useless rewriting from being performed.

In the optical-disc recording device in this embodiment, the lead-in area of the last session of the optical disc 1, on which data was recorded in the multi-session recording system, and in the last session of which recording was performed so that a subsequent session could not exist, that is, appending of data to the optical disc was not possible, is rewritten so that a subsequent session can exist and appending of data to the optical disc 1 is possible. Thereby, it is possible again to record data in a new session, and it is possible to effectively use the property of the optical disc on which re-recording of data can be performed.

Further, the lead-in area of the last session of the optical disc 1, on which data was recorded in the multi-session recording system, and in the last session of which recording was performed so that a subsequent session could exist, that is, appending of data to the optical disc was possible, is rewritten so that a subsequent session cannot exist and appending of data to the optical disc 1 is not possible. Thereby, it is possible to arbitrarily make appending of data to the optical disc 1 impossible.

Further, at the time the above-mentioned state in which appending of data to the optical disc 1 is not possible would otherwise be changed to the state in which appending of data to the optical disc is possible, when the remaining capacity of the optical disc is so small that one session cannot be formed by using the remaining capacity, a re-recording operation for enabling appending of data to the optical disc 1 is prevented from being performed. Therefore, it is possible to prevent useless re-recording for enabling appending to data to the optical disc 1 from being performed, to which optical disc appending of data cannot be actually performed even when the re-recording for enabling appending to data to the optical disc is performed.

The present invention can be easily applied not only to the optical disc such as the CD-RW on which re-recording of data is possible but also to another information recording medium on which re-recording of data is possible and to which the concept of the multi-session recording system can be applied.

Further, the present invention is not limited to the above-described embodiments, and variations and modifications may be made without departing from the scope of the present invention.

The contents of the basic Japanese Patent Application No.10-089006, filed on Apr. 1, 1998, are hereby incorporated by reference.

What is claimed is:

1. An optical-disc recording device comprising:
   a structure recording data on and reproducing data from an optical disc in a multi-session recording system, on which optical disc re-recording of data is possible; and
   a last-session rewriting structure which, if the content of the last session indicates that no subsequent session exists or if the content includes no indication that a subsequent session exists, rewrites the content of a last session of the optical disc such that the content indicates that a subsequent session exists.

2. The optical-disc recording device, as claimed in claim 1, wherein, if the content of the last session indicates that a subsequent session exists, the structure rewriting the content of the last session of the optical disc rewrites the last session such that the content indicates that a subsequent session does not exist or does not indicate that a subsequent session exists.

3. The optical-disc recording device, as claimed in claim 1, further comprising a structure preventing said last-session rewriting structure from rewriting the content of the last session when the remaining capacity of the recording area of the optical disc is so small that one further session cannot be formed by using the remaining capacity.

* * * * *